(12) United States Patent
Wilbur

(10) Patent No.: US 9,774,992 B2
(45) Date of Patent: Sep. 26, 2017

(54) SOFTWARE APPLICATIONS AND WEBSITE PLATFORM FOR RECORDING, DISPLAYING AND SHARING RECEIVER SIGNAL STRENGTHS AND OTHER PARAMETERS

(71) Applicant: John Russell Wilbur, Groveland, CA (US)

(72) Inventor: John Russell Wilbur, Groveland, CA (US)

( * ) Notice: Subject to any disclaimer, the term of this patent is extended or adjusted under 35 U.S.C. 154(b) by 0 days.

(21) Appl. No.: 15/398,698

(22) Filed: Jan. 4, 2017

(65) Prior Publication Data

US 2017/0201856 A1    Jul. 13, 2017

Related U.S. Application Data

(63) Continuation-in-part of application No. 14/273,472, filed on May 8, 2014, now Pat. No. 9,585,039.

(60) Provisional application No. 61/822,222, filed on May 10, 2013.

(51) Int. Cl.
| | |
|---|---|
| *H04W 24/08* | (2009.01) |
| *H04W 4/02* | (2009.01) |
| *H04B 17/318* | (2015.01) |
| *G01C 21/36* | (2006.01) |
| *G01S 19/42* | (2010.01) |

(52) U.S. Cl.
CPC .......... *H04W 4/02* (2013.01); *G01C 21/3614* (2013.01); *G01C 21/3652* (2013.01); *G01C 21/3667* (2013.01); *G01S 19/42* (2013.01); *H04B 17/318* (2015.01)

(58) Field of Classification Search
None
See application file for complete search history.

(56) References Cited

U.S. PATENT DOCUMENTS

| | | | | |
|---|---|---|---|---|
| 7,522,917 | B1 * | 4/2009 | Purdy, Jr. ............... | H04W 24/00 455/422.1 |
| 8,917,158 | B2 * | 12/2014 | Bong ...................... | G06F 3/016 340/5.53 |
| 9,077,812 | B2 * | 7/2015 | Hansen ............. | H04M 1/72547 |
| 2003/0100317 | A1 * | 5/2003 | Kaplan ................ | G08G 1/0104 455/436 |
| 2005/0033515 | A1 * | 2/2005 | Bozzone .............. | G01C 22/006 701/472 |

(Continued)

*Primary Examiner* — Kenny Lin

(57) ABSTRACT

A software application installed on a mobile device moving along a path periodically measures and records a parameter along with the GPS position associated with the measurement. Path data files are recorded on the device's internal memory and may be transferred to and from a repository database to share data between devices. Data may be displayed in the form of a map allowing users to navigate along paths to locations with desired parameter levels. This parameter may be cellular signal strength, allowing users in areas with no usable signal to find a usable signal. If data are preloaded onto a device, signal strength maps can be displayed even when the device has no current data connection. Parameters can be calibrated to compensate for differing sensitivities between device models. Screen dimming and audio cues can reduce battery consumption and the software can alert users when they stray from a desired path.

10 Claims, 24 Drawing Sheets

Map Layer Completely Filled In

(56) References Cited

U.S. PATENT DOCUMENTS

| | | | |
|---|---|---|---|
| 2005/0282540 A1* | 12/2005 | Motamedi | H04W 16/18 455/423 |
| 2006/0128311 A1* | 6/2006 | Tesfai | G01S 5/0252 455/67.11 |
| 2006/0135180 A1* | 6/2006 | Jakel | H04W 48/16 455/456.5 |
| 2008/0102809 A1* | 5/2008 | Beyer | G01C 21/00 455/420 |
| 2009/0164115 A1* | 6/2009 | Kosakowski | G01C 21/3641 701/533 |
| 2009/0201149 A1* | 8/2009 | Kaji | G01C 21/20 340/539.13 |
| 2011/0039573 A1* | 2/2011 | Hardie | G01C 21/005 455/456.1 |
| 2011/0217964 A1* | 9/2011 | Matsuo | H04W 4/02 455/414.2 |
| 2011/0294515 A1* | 12/2011 | Chen | G01S 5/0252 455/456.1 |
| 2011/0306323 A1* | 12/2011 | Do | G01C 21/20 455/414.1 |
| 2012/0309376 A1* | 12/2012 | Huang | H04M 1/72572 455/418 |
| 2013/0317944 A1* | 11/2013 | Huang | G01S 5/0252 705/26.61 |
| 2014/0067257 A1* | 3/2014 | Dave | G01C 21/3461 701/423 |
| 2014/0357302 A1* | 12/2014 | Wilbur | H04W 4/025 455/456.3 |
| 2014/0371887 A1* | 12/2014 | Hoffman | G06K 9/00342 700/91 |

\* cited by examiner

Present Position and Compass

Present Position, Signal Strength Dots, Airplane View

Partial Map Background
Filled In

Map Layer Completely Filled In

Good Signal and No Signal
Icon Dot Examples

Maps1 Software Application

Menu Choices

Settings

Dot Spacing

Calibrate

Trail List

Long Touch Menu

Get Address

May Lake Hike 12 inch Dish Signal Enhanced

Recorded data Chicago to Midland

Recorded Data Close Up
View Landing at Midland

'Off Path Warning' Example of
Warning Suppression Limit Boundary

SOFTWARE APPLICATIONS AND WEBSITE PLATFORM FOR RECORDING, DISPLAYING AND SHARING RECEIVER SIGNAL STRENGTHS AND OTHER PARAMETERS

CROSS-REFERENCE TO RELATED APPLICATIONS

The present application is a continuation-in-part of application Ser. No. 14/273,472 filed on Aug. 5, 2014, which claims the benefit of Provisional Patent Application No. 61/822,222 filed on May 10, 2013, the entire contents of which are incorporated herein by reference in its entirety.

BACKGROUND OF THE INVENTION

1. Field of the Invention

The Parent inventions relate to the technical field of wireless communication devices and, in particular, to techniques for measuring, recording, storing, retrieving, and displaying signal strengths and other parameters as a function of location along paths. This C.I.P. teaches critical improvements that increase a mobile device's battery life while recording signal strength and other parameter data, uses a sensitivity calibration method to solve the problem of differences in signal sensitivities between device models, and enables efficient sharing of map-based signal strength and other parameter path data to internet-based cloud storage platforms.

2. Description of Related Art

It is well known in the art that cellular wireless systems rely on base stations that cover a limited geographic area, and that a cellular telephone needs to be within the reach of a base station to be able to place, receive or conduct a call. Coverage in any cellular system is not universal, and mobile devices are well-known to have an ability to display signal strength.

In some circumstances signal strength may be a life-or-death matter. There are many instances where a person or persons have gotten lost in an area with poor or no cellular coverage, and has died as a result of not being able to call for help.

There exist databases of cellular signal strength as a function of location, but these data are unavailable when a user needs them the most, that is, when the user is already in a location with no useable cellular signal. Additionally, existing databases are designed to allow a user in a fixed location to choose an optimal service provider and show zones of predicted signal strength based on measurement and interpolation rather than showing exact locations with measured data. These existing databases also require the user to be in an area where there is at least some signal in order to compare signals between available networks in order to pick the best choice of service provider. These databases also do not allow users to display or select data based on the path taken during data measurement—a user standing in one location without a phone signal who wishes to move toward the nearest location with a useable phone signal is not provided with a navigable path between those locations. Traveling directly toward the desired location may cause the user to encounter dangerous, impassable obstacles like rivers, roads, mountains, or landmines.

When a mobile device user has poor or no cellular coverage, there is no way for said user to know where a useable cellular signal might be found. For example, thousands of people die every year while lost in the wilderness, but if they were able to place phone calls for help they could be rescued. Many of those people are within walking distance of a useable cellular signal but have no way of knowing whether it exists or where to find it. All existing web-based signal strength databases provide no information when users need it most, i.e., when they have no cellular coverage.

A solution to this technical problem that would provide signal strength and location information to users in a no-coverage location, allowing them to follow an established navigable path to find a useable cellular signal would thus be of great value. Several advantages of one or more aspects are to provide a map of cellular signal strength data as a function of location that is available to a mobile device user even when said device is unable to access the internet. The Parent application Ser. No. 14/273,472 teaches the recording, displaying, and sharing of signal strength data along a path. There is no standardization between mobile device manufacturers to address the different sensitivities of mobile devices. The signal strength threshold for making a phone call on one model of mobile device may be −101 dBm and on another mobile device it may be −114 dBm. This C.I.P. teaches methods of calibration to correct for differences in sensitivities between different devices.

A mobile device's display consumes a significant percentage of the total power used by the mobile device and therefore limits the time the mobile device can be powered on before requiring a recharge. This C.I.P. teaches a solution for extending the mobile device's battery life while collecting path-based parameter data by allowing the recording of data in the background, when screen is turned off completely while the application is still running. Another mode of the application allows the display screen to be dimmed between recording each data point, brightening as each data point is collected to show the result to the user. While the application is running in either the screen-off background mode or the dimmed screen mode, the application can play audio cues on the phone to communicate information about the collected data, with different sounds representing different thresholds of signal strength, distance from a navigable path, or other parameters.

These and other advantages of one or more aspects will become apparent from a consideration of the ensuing description and accompanying drawings.

BRIEF SUMMARY OF THE INVENTION

In accordance with one embodiment, a software application installed on a mobile device records a cellular signal strength and an associated latitude and longitude at predefined intervals of time or distance, and/or every time the measured signal strength changes. The signal strength and corresponding location coordinates may be recorded on the mobile device and also may be transmitted to other devices or repository databases. Before a user enters an area with poor signal strength, the signal strength and corresponding location coordinates defining navigable paths for that area, previously collected by one or more devices or users and stored in the repository databases, may be transmitted from said repository databases to the user's mobile device and stored in its internal memory. Said signal strength and corresponding location coordinates can provide the user of said device with a map of signal strength as a function of location even in an area with no cellular coverage and thus no ability to access the data from the repository databases in real time.

The repository databases and associated software may transmit said signal strength and corresponding location coordinates defining navigable paths for that area, through an automated process without prompting by the user, with the locations to be covered by said signal strength data chosen based on the user's direction of travel or through an analysis of the user's upcoming travel plans attained through electronic records on the user's phone, computer system, electronic mail service, or another internet-connected account. In addition to cellular signal strength, other parameters defining navigable paths may be recorded in repository databases and retrieved for the user using the same method. Alternatively, users may select the data they would like to display or download from the repository databases or associated software using a path-based selection mechanism that retrieves data based on the path followed by the device that originally measured and recorded the data, providing trails of data along navigable routes.

When a user is depending on the application for navigational guidance along a previously recorded path, it would be advantageous to not have to keep the screen powered the entire time that the path is being followed. In a preferred embodiment, the application plays a warning sound and/or a vibration from the mobile device notifying that the user has strayed from the path more than a specified distance. The user could then turn on the screen in order to determine his or her location in relation to the recorded path and use the application to return to the path.

In addition to loading onto a mobile device's internal memory, parameter data and corresponding location coordinates may be displayed as a map layer through a user interface accessible through the internet and printed on paper or displayed on another device such as a tablet or dedicated GPS navigator, allowing even users who do not possess smartphones to access and benefit from the data in the repository database. Measured, recorded, and retrieved data may also include parameters such as velocity and acceleration, for example allowing the location-dependent data to be used to quantify smoothness of roads or other properties measurable by devices.

When a mobile device is in airplane mode, the GPS can still be activated allowing location and other parameter data to still be recorded without connecting to a wireless network. This allows path location data, including altitude and other data to be recorded while flying in an airplane, or any other type of flying machine while still complying with any FAA rules restricting any mobile devices from connecting to cellular networks while in flight.

DETAILED DESCRIPTION OF THE INVENTION

Figure 1:
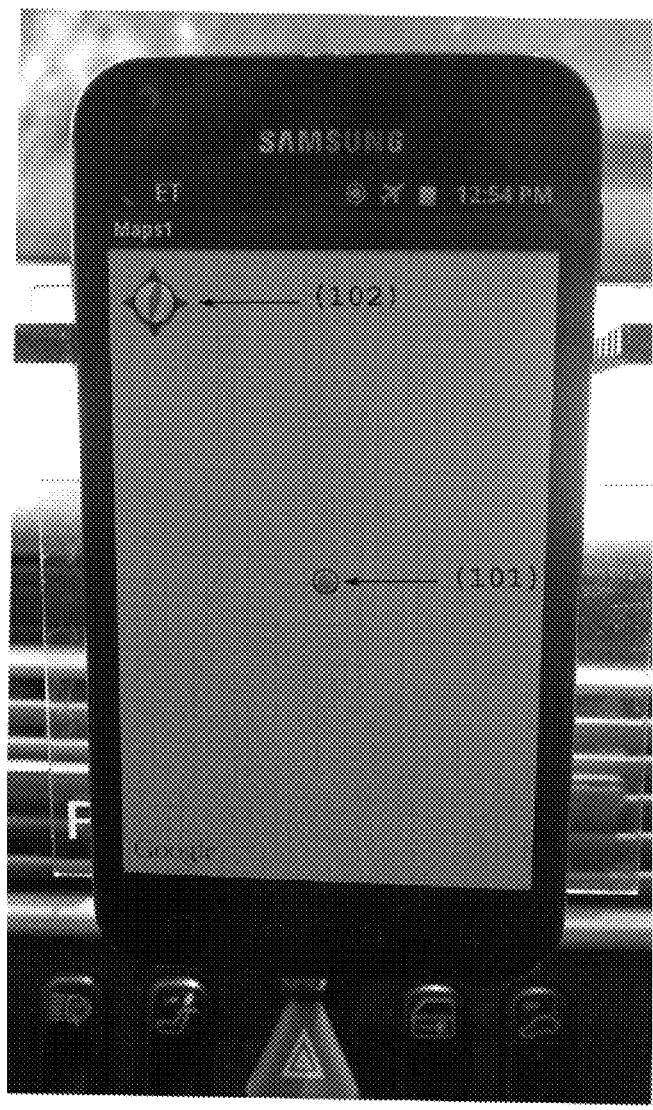
FIG. 1 is a view of a software application for measuring, recording, and displaying signal strength data as a function of location in one embodiment of the present invention.

FIG. 1 is an illustration of a software application for measuring, recording, and displaying signal strength data as a function of location according to an embodiment of the present invention. In this embodiment there is a blue icon 101 indicating the current position of a device running the software application as determined by GPS. In this embodiment a compass 102 in FIG. 1 shows the orientation of the device, which can aid a user in navigating from the current location to another location on the map. When signal strength and location are measured and recorded, additional parameters measurable by the device can be measured and recorded as well, including acceleration, velocity, altitude, and the number of satellites detected by the GPS system.

Figure 2:
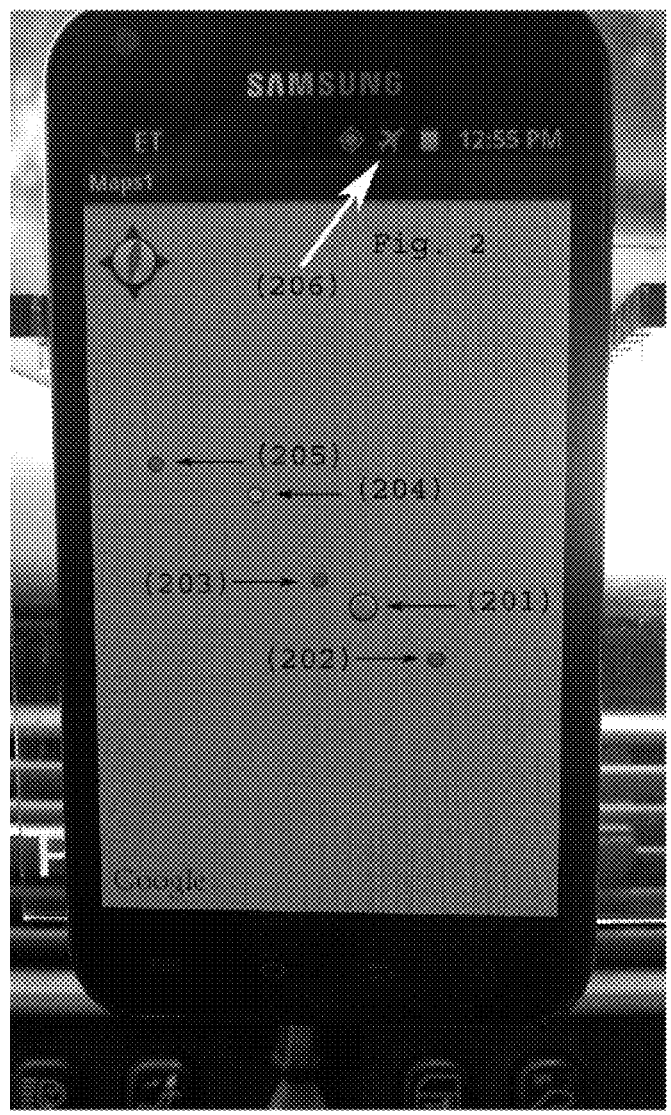
FIG. 2 is a view of the software application of FIG. 1 in which methods for displaying recorded signal strength as a function of location along a path are shown.

FIG. 2 is an illustration of a software application for measuring, recording, and displaying signal strength data as a function of location according to an embodiment of the present invention. In this embodiment there is a blue icon 201 indicating the current position of a device running the software application as determined by GPS, serving the same function as the blue icon 101 in FIG. 1. In this embodiment there are 4 additional icons, 202, 203, 204, and 205, arranged to form a map based on the positions at which signal strength and location data were recorded. Each of these icons communicates the signal strength at its location by the design of the icon. In this embodiment, red circular icons 202, 203, and 205 indicate a signal strength that was very low or undetectable. A green circular icon 204 indicates a strong signal strength, showing the user that a phone call can be made from this location. Icon design can communicate a range of values, for instance by using a yellow circular dot to indicate a marginally useable cellular signal or by varying icon shape to indicate the age of the data or the type of device that acquired it. Icon 206 shows that the mobile device is in "airplane mode" during this operation, demonstrating that the software application can be used when the mobile device has no cellular data connection.

The user may use the map shown in FIG. 2 in this embodiment to navigate from current location icon 201 to useable cellular signal location 204 in order to make a call. As the user walks toward the desired location 204, the GPS determined present position indicates the user's progress in real time.

The signal strength data displayed through icon design in FIG. 2 in this embodiment can either be recorded by the same device on which it is displayed, or it may be recorded by another device or set of devices and then downloaded onto the displaying device. If a user were to run the software application after arriving in an area with no cellular service and if the software application had not previously downloaded signal strength and location data for that area, the software would periodically measure signal strength and location data, along the path the user followed, and record it to the device's internal memory. Said data would then be displayed in the form of a map similar to that shown in FIG. 2. If the software application downloaded signal strength and location data from a repository database or another device before the user entered the area with no cellular service, that data would be displayed on the map in addition to the signal strength and location data collected by the user. In either case, once the device regains a data connection the software would optionally upload the signal strength and location data to a repository database so that other users would be able to access it and, if necessary, preload it before entering an area with no cellular service.

Figure 3:
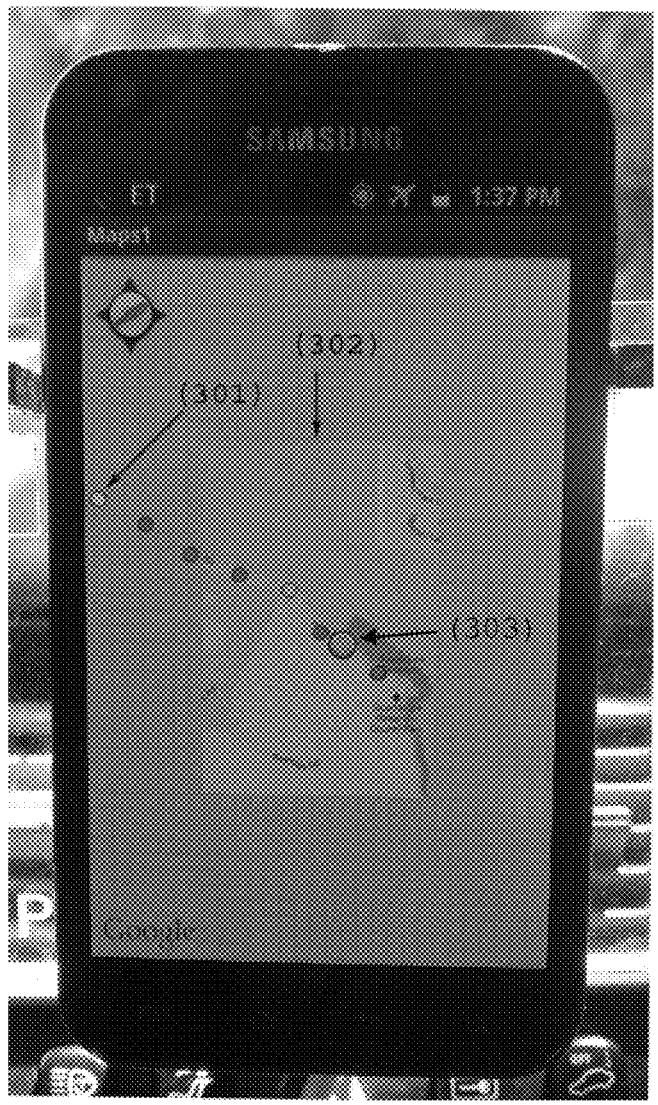
FIG. 3 is a view of the software application of FIG. 1, in which recorded signal strength data as a function of location along a path are superimposed on a corresponding roadmap image that has partially downloaded to the phone.

FIG. 3 is an illustration of a software application for measuring, recording, and displaying signal strength data as a function of location according to an embodiment of the present invention. In this embodiment the signal strength data as a function of location are superimposed on a corresponding roadmap image that has partially downloaded to the phone. The overlay display improves a user's ease of navigation between current location, indicated by the blue icon 303, and the location of a useable cellular signal 301. This illustration demonstrates partial loading of the roadmap layer in the form of roadmap tile 302 being displayed behind the signal strength icon layer. The software application is always able to display the signal strength icon layer and loads as much of other useful layers as possible depending on the user's preference and the availability of a data connection.

Figure 4:
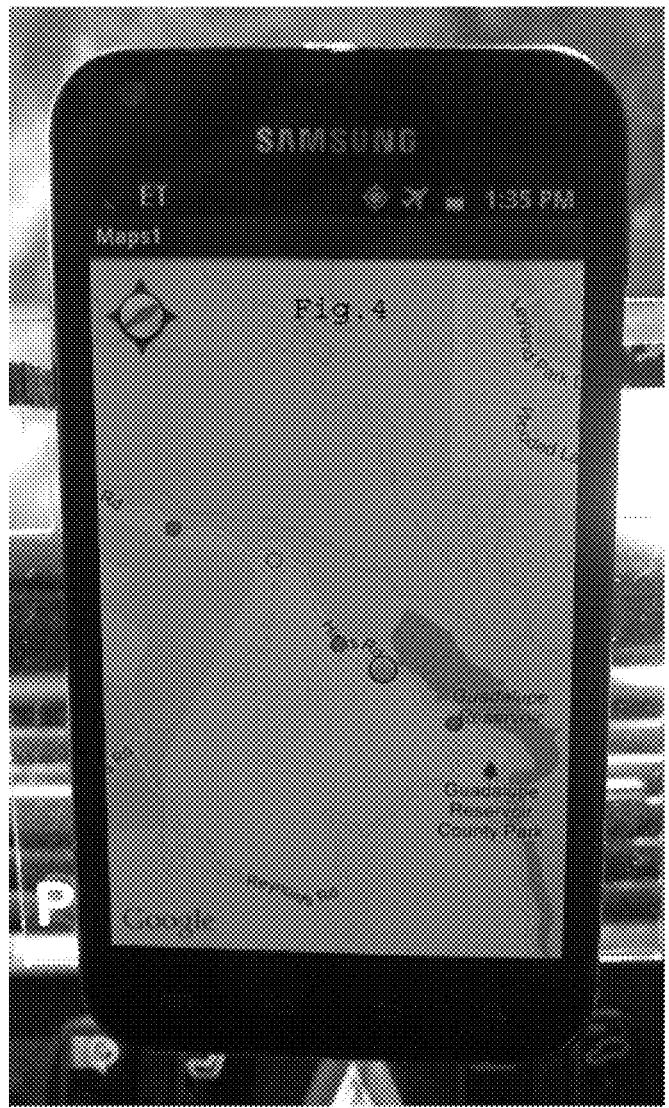
FIG. 4 is a view of the software application of FIG. 1, in which signal strength data as a function of location are superimposed on a corresponding roadmap image that has completely downloaded to the phone.

FIG. 4 is an illustration of the software application embodiment of FIG. 3 in which the roadmap layer has completely downloaded, allowing for the display of a complete roadmap layer behind the signal strength icon layer.

Figure 5:
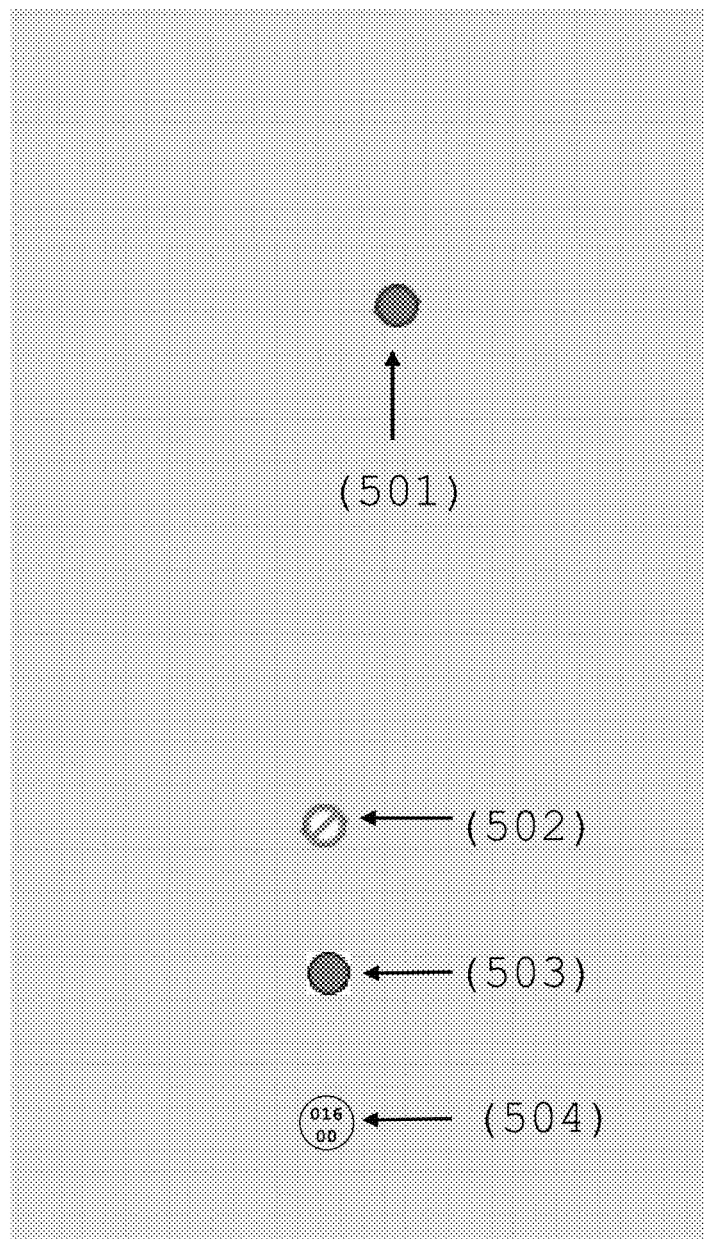
FIG. 5 is a view of the software application of FIG. 1, in which signal strength data as a function of location shows a single solid green circle 501 indicating high signal strength and a single white circle 502 surrounded by a red outline and a diagonal red line extending from the outline through the center of the white circle to indicate a point with no detected signal, and a solid red circle 503 indicating a low or weak signal. Another type of useful icon is 504 that displays digital data inside of the icon, that can be used to convey GPS determined altitude or any other numeric that represents any related sensor value available through the mobile device.

FIG. 5 is a view of the software application of FIG. 1, in which signal strength data as a function of location shows a single solid green circle 501 indicating high signal strength, a single white circle 502 surrounded by a red outline and a diagonal red line extending from the outline through the center of the white circle to indicate no detected signal, a solid red circle 503 indicating a low or weak signal, and icon 504, which includes a series of digits that can be used to convey GPS-determined altitude or any other numeric value that represents a parameter available through the mobile device. The condition of no detected signal, represented by icon 502, indicates that the mobile device receiver has no connection at all to any base station cell tower. Low signal strength, represented by icon 503, indicates that the mobile device still has a connection to a cellular phone base station, but that the signal strength is too low to enable communication. If the mobile device is unable to detect a wireless signal, a separate icon can be used in the signal strength indicator to distinguish this result from that of a low but detectable signal strength. This indication of no detected signal is distinct from a data point indicating unusably low signal and conveys unique information that can help to guide a user toward higher signal strength. For example, a device user with very low signal as indicated by icon 503 can amplify that signal with external hardware such as a wireless parabolic dish reflector described in patent application Ser. No. 14/204,296 in order to make a phone call, while a user in a location with no detectable signal, indicated by icon 502, may not have any signal to amplify even with said signal enhancer hardware.

In one embodiment, the software may play a sound on the mobile device's speakers or headphone connection or activate the device's vibration motor to indicate the detection of a mobile signal strength matching a set of conditions. In a preferred embodiment, the software may play a sound whenever a mobile signal sufficiently strong to make a phone call is detected.

The recorded signal strength or other location-dependent measured data can be transmitted from the mobile device's internal memory to a repository database, for example one connected to the internet. Data stored in the repository database can be collected from large numbers of devices and large numbers of users. The path data stored in the repository can be accessed through several methods, for example it can be downloaded by the software application in FIG. 1, or it can be accessed through a website interface.

Additionally, the recorded signal strength or other location-dependent measured data can be transmitted from one device to another through a file transfer using any normal means of file transfer, such as email, or other available file transfer protocols to a cloud based data repository. Another type of useful icon is 504 that displays digital data inside of the icon, that can be used to convey GPS determined altitude or any other numeric that represents any related sensor value available through the mobile device.

The data to be downloaded onto a mobile device or viewed on a website can be filtered by criteria either set by users or by the software application. For example, a user could choose to download only signal strength and location data collected in specific areas, by specific phone models, or pertaining to specific cellular service providers. The software application may filter based on those criteria as chosen by the user or based on an automated prediction of which areas, phone models, and cellular service providers would be of interest to the user.

In one embodiment, the software application in FIG. 1 can reduce the brightness of the device's display or turn the display off between recording data points, extending the device's battery life. The display is brightened to its normal level for a fixed time when each dot is recorded. In another embodiment, the user can turn off the device's display manually while the software continues to run.

When a device is carried in a vehicle while the software application in FIG. 1 measures and records acceleration values using a device's accelerometers, the peak, mean, median, and root mean squared acceleration values acceleration along each direction measured by the device as a function of location and velocity can be used to measure and quantify the smoothness of the road traveled by the vehicle. This data can be used to measure the quality of the road and can be displayed such that locations with high peak or sustained acceleration are identified by the software application or in a repository database. This data can be used to identify and lead the user along navigable paths to locations where road repairs would be most beneficial or where road conditions may be hazardous to drivers.

Figure 6:
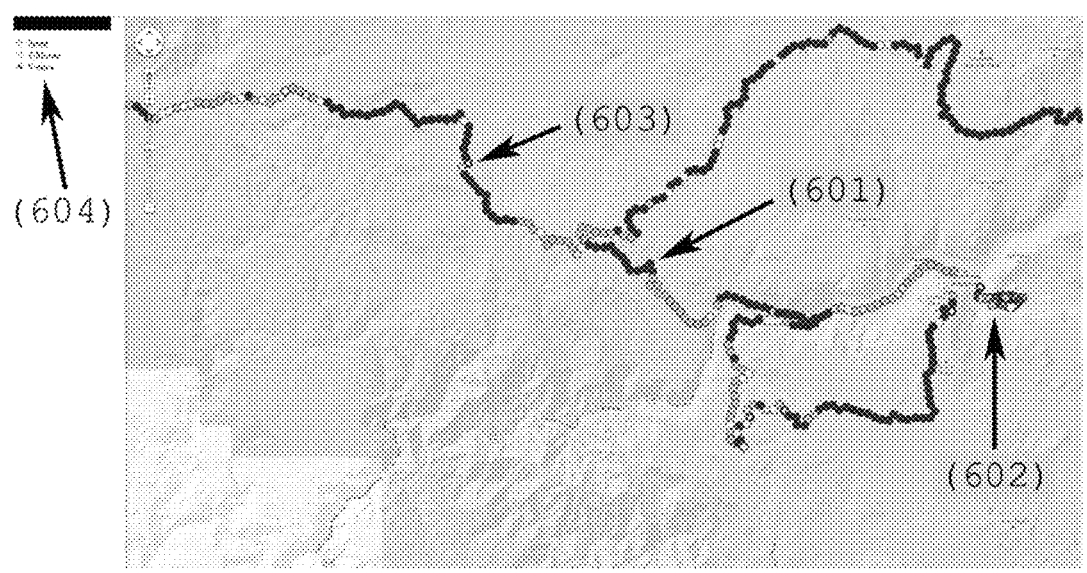
FIG. 6 is a view of a graphical interface displaying signal strength and corresponding location data stored in a repository database, retrieved based on user-inputted filters, and displayed as a map through a user interface accessible through the internet.

FIG. 6 is a view of signal strength and corresponding location data stored in a repository database, retrieved based on user-inputted filters, and displayed as a map through a user interface accessible through the internet. In this embodiment signal strength at a given location is indicated by the color and shape of circular icons displayed at said location on a map. In this embodiment, red circular icons 601 indicate a signal strength that was very low or undetectable, green circular icons represent a strong, useable cellular strength, and yellow circular icons represent intermediate signal strength between the signal strength represented by a red icon and the signal strength represented by a green icon.

In this embodiment, the spacing between icons to be displayed is adjustable by the user, with a ¼ mile spacing selected at the location of the red circular icons 601, on a road going into Yosemite National Park and a 150-foot spacing selected at the location of the more densely populated icons 602 near the hiking trail to Nevada Falls.

In this embodiment, icons containing multiple colors such as the red and yellow icon and green and yellow icon 603 indicate signal strength between red and yellow or green and yellow thresholds, respectively. In this embodiment the signal strength thresholds corresponding to each icon design are selectable by the user.

In this embodiment, the user interface allows users to select a cellular service provider through the menu 604. When a user selects a service provider, signal strength and corresponding location data collected by devices connected to the selected provider's network are retrieved from the repository database and displayed on the map.

The subset of data retrieved from the repository database can be adjusted by the user, software running on the user's mobile device or computer, or the software running on the repository database server based on parameters including cellular service provider, location, time, device model, altitude, average strength of a signal in the area, and other parameters.

In a preferred embodiment, when signal strength or other data is collected by the software and stored as a function of location, path-based data sets are saved and labeled with the device's date, time, and device-name labels. Through these labels, each session of data collection creates a path of data consisting of a series of data points at sequential recorded locations. When the data is displayed, the series of points creates a path that maps the navigable path taken by the device when the data was collected. When the data is stored in a repository database, this label is retained, and when users select a subset of the database to retrieve and either display on a computer or copy to a device, they can choose the subset they wish to retrieve by selecting all or portions of these paths. This provides a distinct benefit over the selection method used to select a subset of data to load onto a device in previous mapping software, for instance the Android Google Maps application. Google maps and other map software that allow data to be downloaded to a device for offline viewing force users to download areas, typically by drawing a rectangle around selected areas of the map that will be copied to the device for off network use. This area-selection method can be performed in another embodiment of the software application in FIG. 1 or the graphical database interface in FIG. 6. However, the novel method described in this preferred embodiment has a benefit over said area selection method because it allows users to select only data along their actual path of travel rather than drawing a rectangle that will fit around it, thereby substantially reducing the amount of data needed for transfer and storage. Additionally, the path-based data storage and retrieval used in the inventive software is superior when used for navigation compared to area-based data storage and retrieval because each dataset shows the path taken when it was collected. For example, if a user retrieves data covering an area with obstacles such as buildings, difficult terrain, or rivers and uses it to find the nearest location where signal strength is sufficient to make a phone call, the user will only see where that location can be found, not how to navigate to it. The user of an area-based data storage and retrieval application may encounter unpassable terrain and have no indication of how to navigate around it. The path-based storage and retrieval of datasets instead informs the user of a navigable path that has already been traveled successfully at the time that the data was recorded. The user of the path-based software can simply follow the path-based data set directly to the nearest useable signal.

FIGS. 7-11 illustrate steps in a path-based selection method in which a user can select sets of data along paths for display or to transfer the data sets from a repository database to the software application in FIG. 1. In this example, the path selection method is performed through an embodiment of the graphical user interface shown in FIG. 6 with each selection made through the user selecting points using a computer. In other embodiments, the same procedure may be used to select sets of data from the software application in FIG. 1 in order to transfer those data sets from the application software directly to another device or to a repository database.

Figure 7:
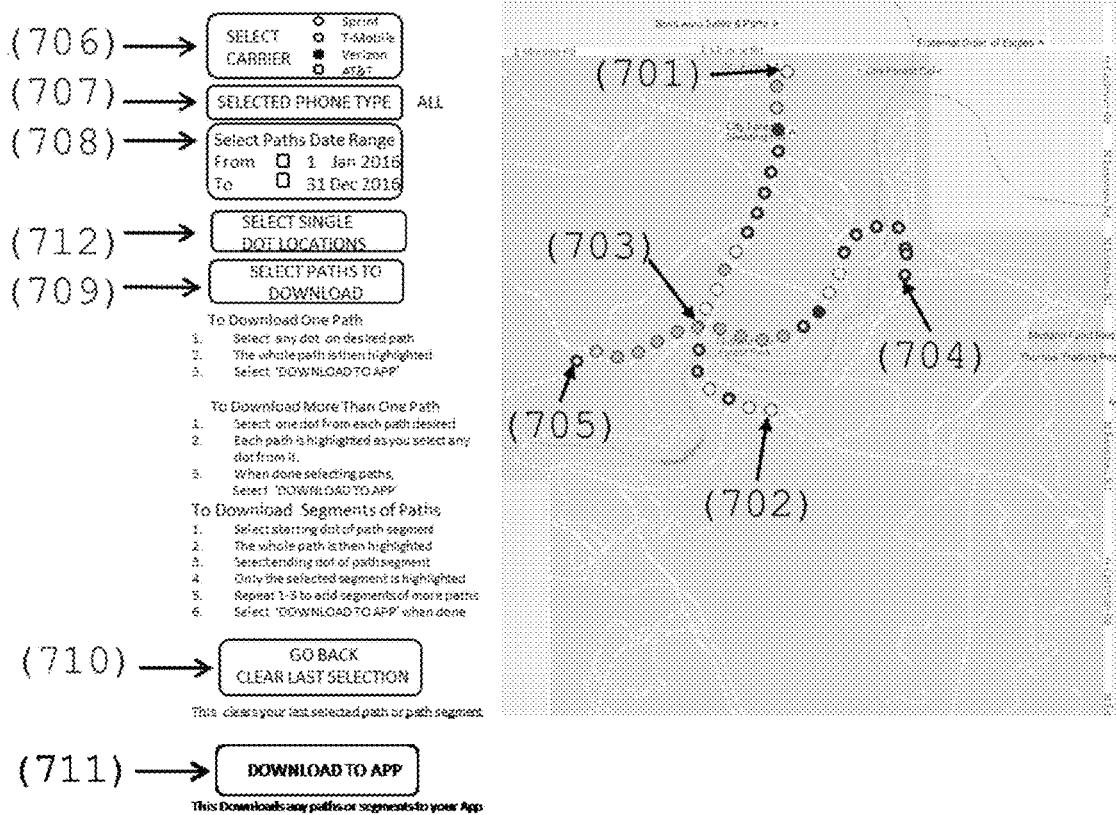
FIG. 7 is an image showing a view of two data sets along navigable paths. This is part of a series of FIGS. 7-11 that demonstrates a method to select subsets of multiple path-based data sets to create a single conjoined path-based data set.
Figure 8:
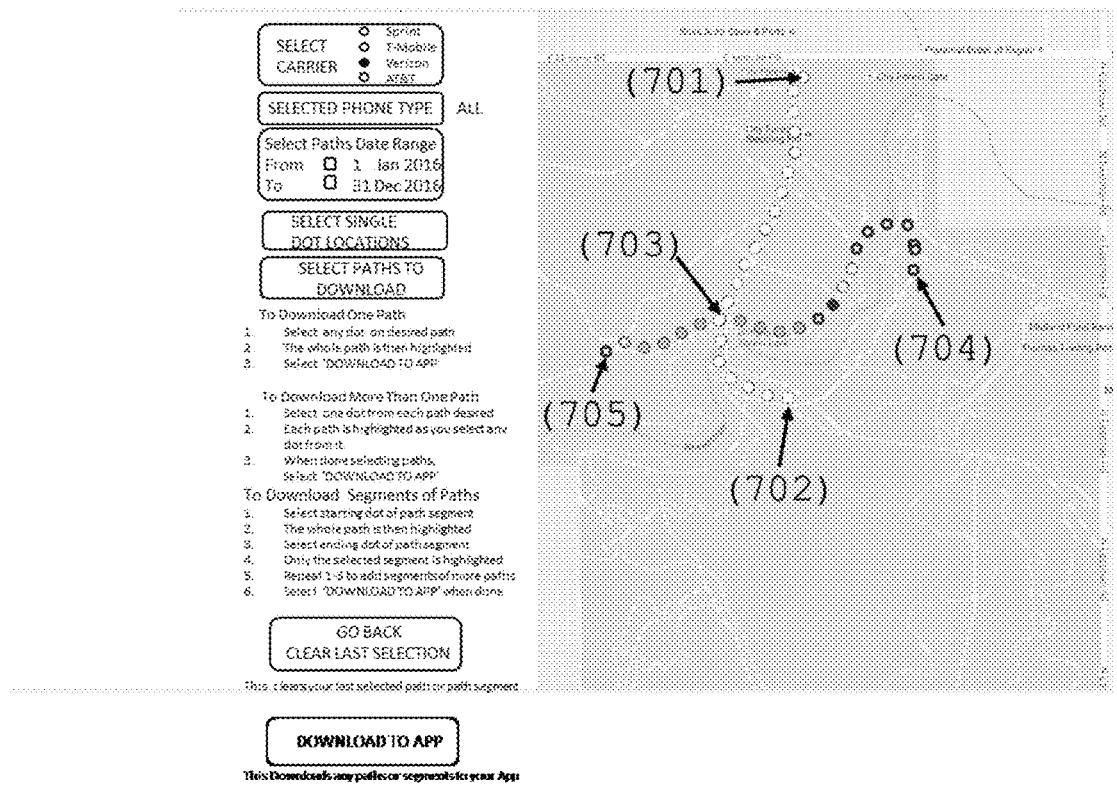
FIG. 8 is an image showing a view of two data sets, one of which from 701 to 702 has been selected by a user. This is part of a series of FIGS. 7-11 that demonstrates a method to select subsets of multiple path-based data sets to create a single conjoined path-based data set.
Figure 9:
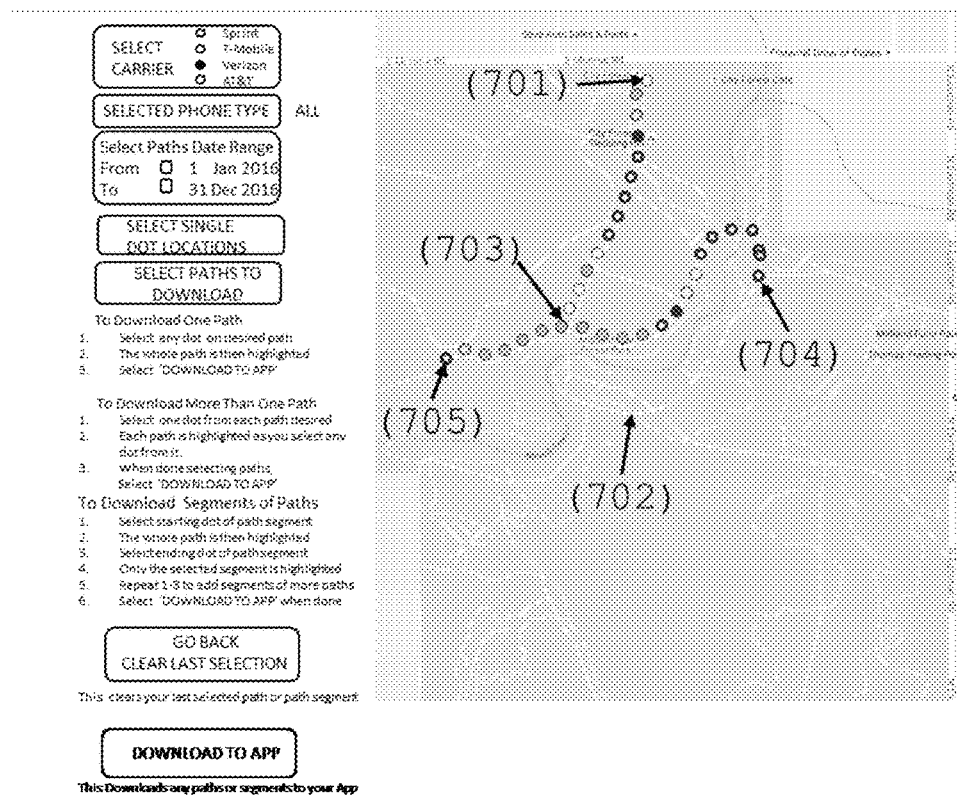
FIG. 9 is an image showing a view of two data sets, in which the path-based data set that originally extended along a path from 701 to 702 has now been reduced by a user to extend along a path from 701 only to 703. This is part of a series of FIGS. 7-11 that demonstrates a method to select subsets of multiple path-based data sets to create a single conjoined path-based data set.
Figure 10:
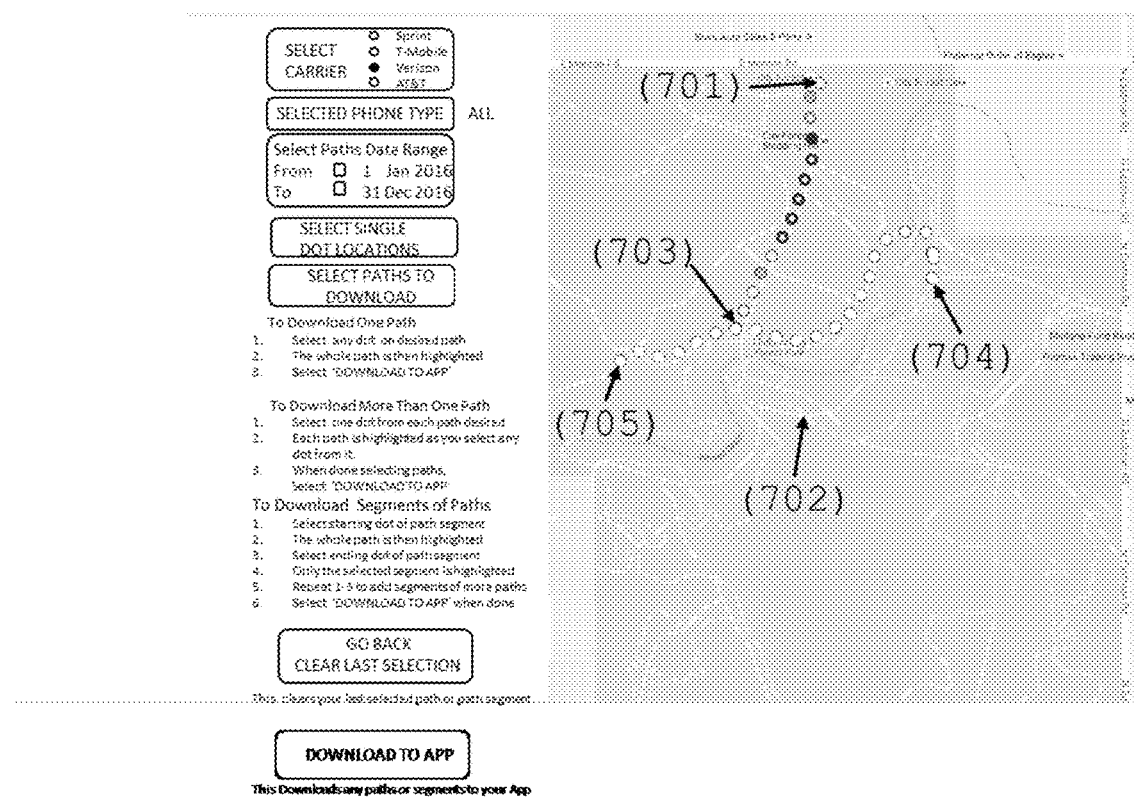
FIG. 10 is an image showing a view of two data sets, in which the path-based data set that originally extended along a path from 701 to 702 has now been reduced by a user to extend along a path from 701 only to 703. The other path-based data set from 704 to 705 has been selected by a user. This is part of a series of FIGS. 7-11 that demonstrates a method to select subsets of multiple path-based data sets to create a single conjoined path-based data set.
Figure 11:
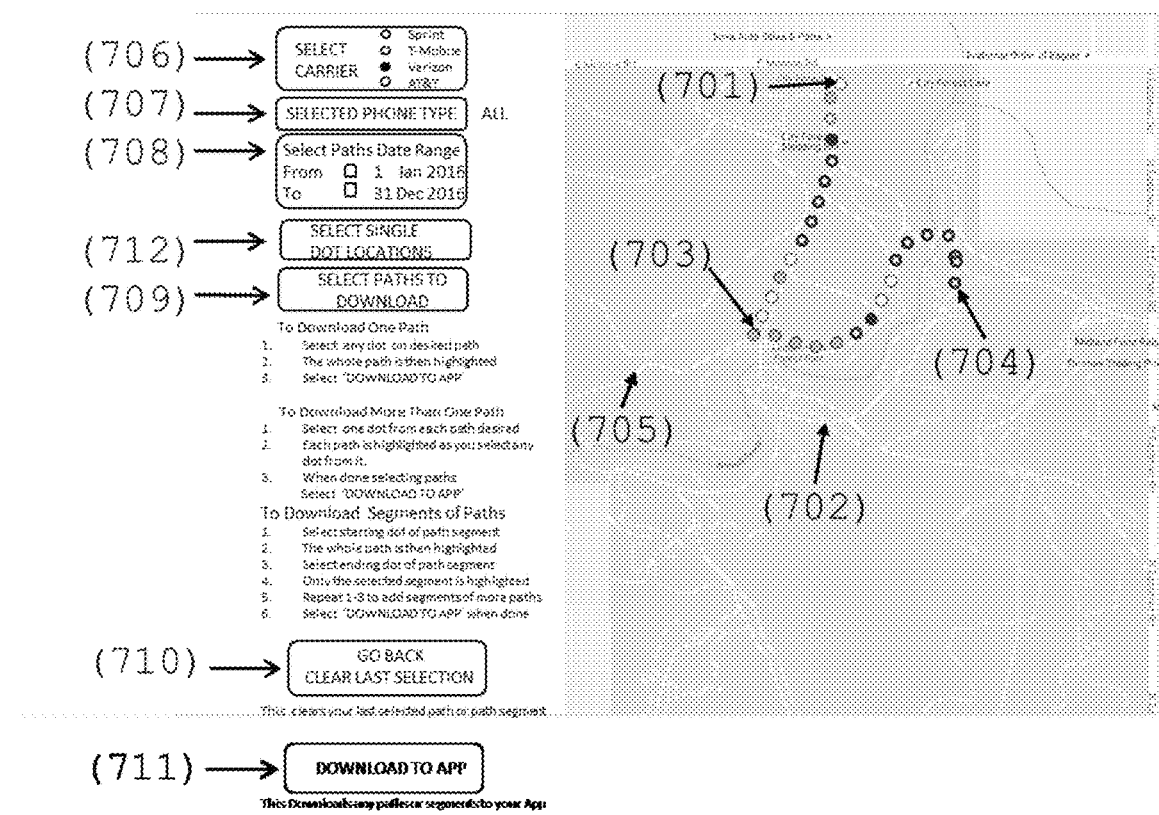
FIG. 11 is an image showing a view of two data sets, in which the path-based data set that originally extended along a path from 701 to 702 has now been reduced by a user to extend along a path from 701 only to 703, and the path-based data set that originally extended along a path from 704 to 705 has now been reduced by a user to extend along a path from 704 only to 703. This combined data set allows a user to follow the newly defined conjoined path. This concludes a series of FIGS. 7-11 that demonstrates a method to select subsets of multiple path-based data sets to create a single conjoined path-based data set.
Figure 18:
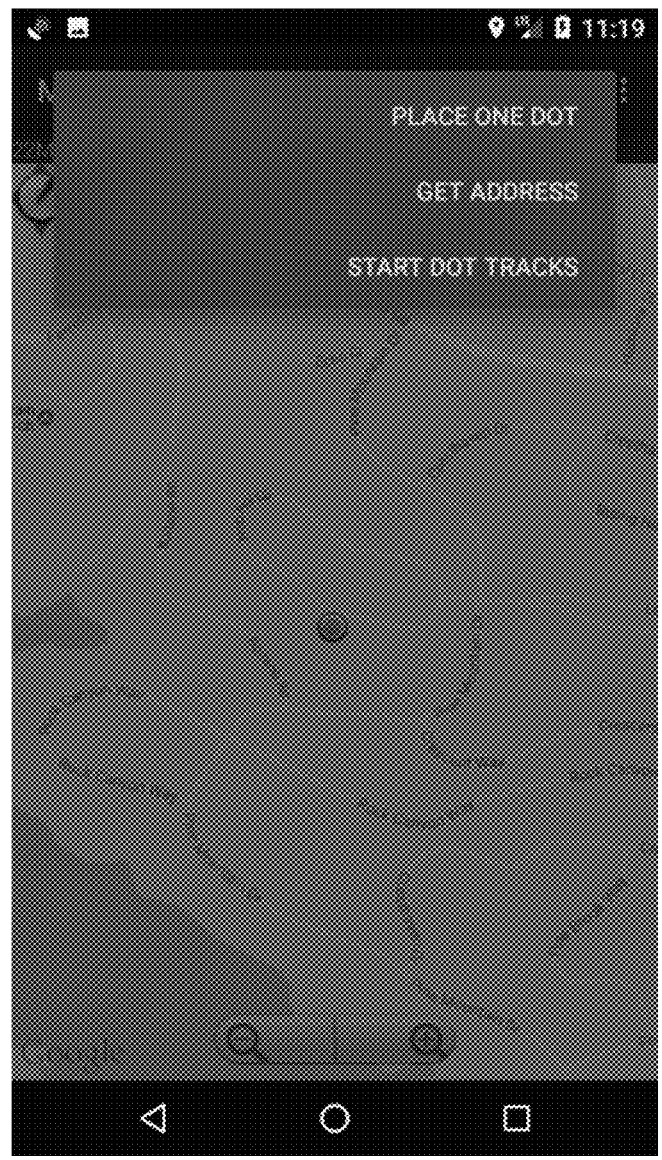
FIG. 18 is a view of a software application for measuring, recording, and displaying signal strength data as a function of location in one embodiment of the present invention showing a "Long Touch Menu" that appears when the user performs a long touch, touching a location on the screen for several seconds rather than through a brief touch.
Figure 20:
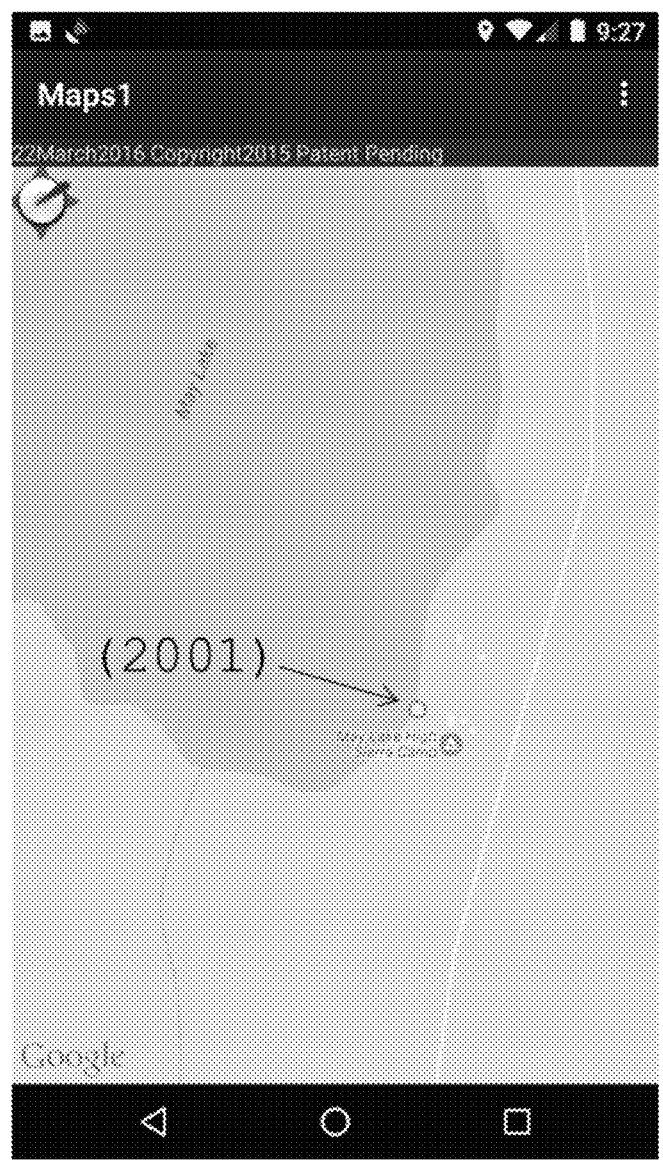
FIG. 20 is a view of a software application for measuring, recording, and displaying signal strength data as a function of location in one embodiment of the present invention showing a location 2001 where a weak signal was amplified using a parabolic dish signal enhancer to the extent that it was strong enough to place a cellular phone call.

FIG. 7 shows a graphical interface that allows a user to filter desired signal strength path-dependent data sets. The selected carrier 706 in this example is Verizon. The selected phone type 707, indicating which data to include based on the model of mobile device with which it was collected, is ALL. Other phone types can be selected to limit the data set to only data collected with a specific mobile device model. The path date range has been selected through date picker menu option 708 to include only data collected between 1 Jan. 2016 and 31 Dec. 2016. Menu option 712, SELECT SINGLE DOT LOCATIONS, provides the user with the ability to display only single, recorded data points as shown by FIG. 18 "PLACE ONE DOT" and FIG. 20 dot 2001. However, in this FIG. 7 example the SELECT PATHS TO DOWNLOAD menu option 709 was selected rather than 712, resulting in the display of path-dependent data sets rather than individual data points. This example shows two signal strength data sets, one along a path from 701 to 702 and another along a path from 704 to 705. The two paths cross near 703, where overlapping points from each data set are displayed. In this example, the user will select a subset of data, including portions of these two paths of location-dependent data, based on the user's need to travel from 701 to 704. Neither path-based data set travels from 701 to 704, but by conjoining a portion of the 701 to 702 path with a portion of the 705 to 704 path, the user can construct a path that has been proven by previous users, when recorded, to be navigable along the desired path, passing through 703. Step 1 of the path selection method is to select, using a mouse click or by touch, a point along one of the path-based data sets that will serve as the first point for the desired conjoined data set. In this example, the user selects point 701. The graphical display of data changes when point 701 is selected to the image shown in FIG. 8, where all of the points along the path contained in the selected data set change color to white, in this embodiment. The user then selects one of the white points, in this example point 703, to define the last point from the selected data set that will be included in the desired conjoined data set. The graphical display of data changes when 703 is selected by making all of the points in the 701 to 702 data set, that are not between or equal to 701 and 703 disappear, and all of the points return to their original colors based on signal strength, as shown in FIG. 9. The data between 703 and 702, which the user chose not to include, are no longer visible. The user then continues to define the desired conjoined data set by selecting 704, which turns all of the points in the data set from 704 to 705 white and defines 704 as the first point in this data set to include in the desired conjoined dataset, as shown in FIG. 10. The user then selects the white point at 703, defining the last data point from the selected data set that will be included in the desired conjoined data set. The graphical display of data changes when 703 is selected by making all of the points in the 704 to 705 data set, that are not between or equal to 704 and 703 disappear, and all of the points return to their original colors based on signal strength, as shown in FIG. 11. In this figure, the user has completed selection of the desired conjoined data set and included portions of the path-based data set from 701 to 702 and the path-based data set from 704 to 705, creating a single conjoined data set that provides data along a navigable route from 701 to 704. Throughout this process, if the user makes a mistake and wishes to undo an input, the "GO BACK CLEAR LAST SELECTION" button 710 can be selected to sequentially undo recent inputs.

The user can then download this newly created conjoined path to the mobile device application by selecting the "DOWNLOAD TO APP" button 711 of FIG. 11. In one embodiment this can open a dialog box allowing the user to provide an email address to which this path file will be sent. When the user then runs the application on a mobile device, the application downloads the path file from email to the phone's memory and adds it to a list of track files. The user can then select this path file for display in the application.

The user can print a paper copy of the selected map view. A printed copy allows anyone to utilize the map to find locations where a cellular phone call can be made, without requiring a smartphone.

The method illustrated in FIGS. 7-11 can be implemented to conjoin any number of path-based data sets. Any data point from any path can be selected as an end point to a subset of that path to be included in the desired conjoined data set.

Figure 12:
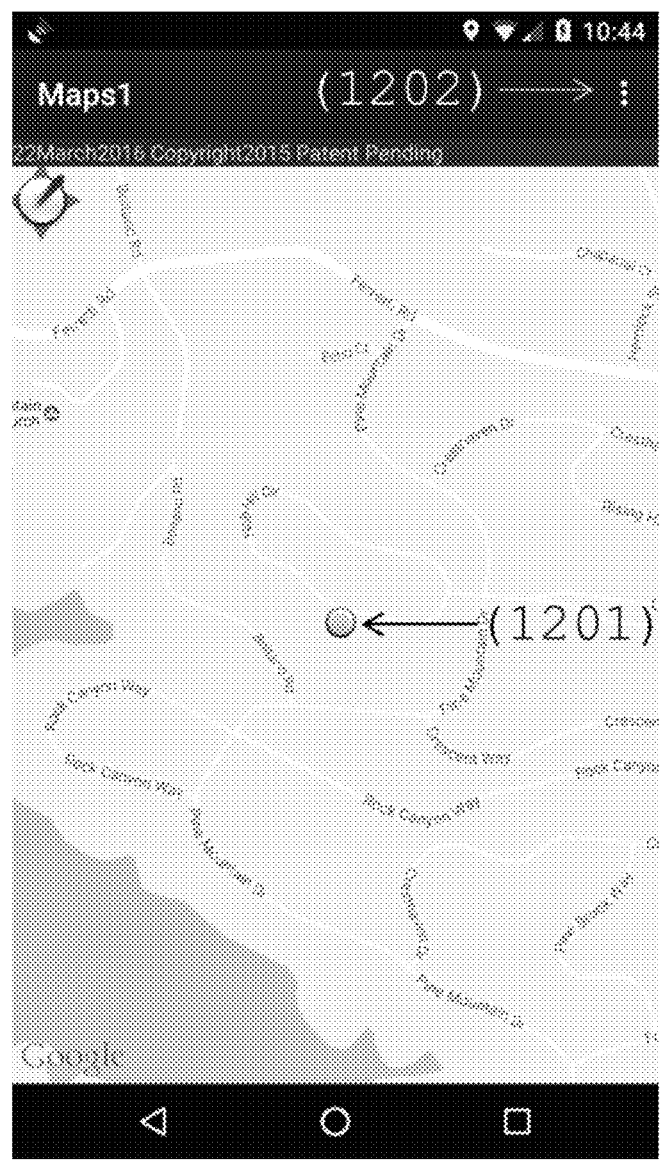
FIG. 12 is a view of a software application for measuring, recording, and displaying signal strength data as a function of location in one embodiment of the present invention, showing an image similar to FIG. 1 but with a Nexus 5X cellular phone utilizing the three vertical dots overflow icon 1202 allowing access to menu 1301.
Figure 13:
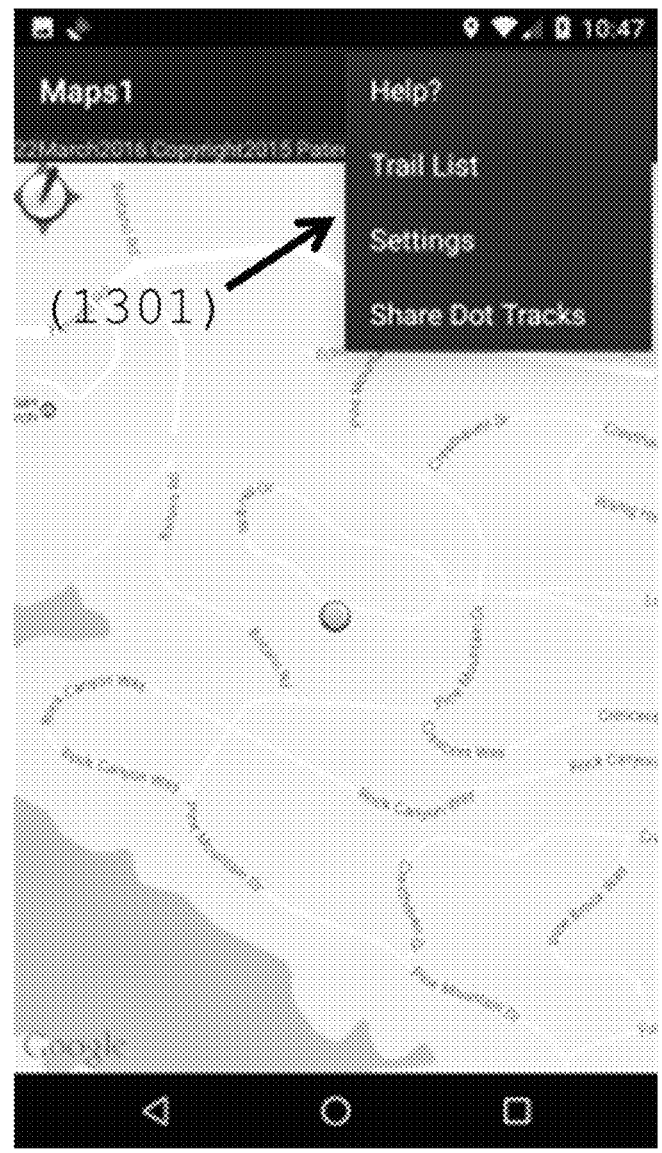
FIG. 13 is a view of a software application for measuring, recording, and displaying signal strength data as a function of location in one embodiment of the present invention displaying menu 1301 to the user.
Figure 14:
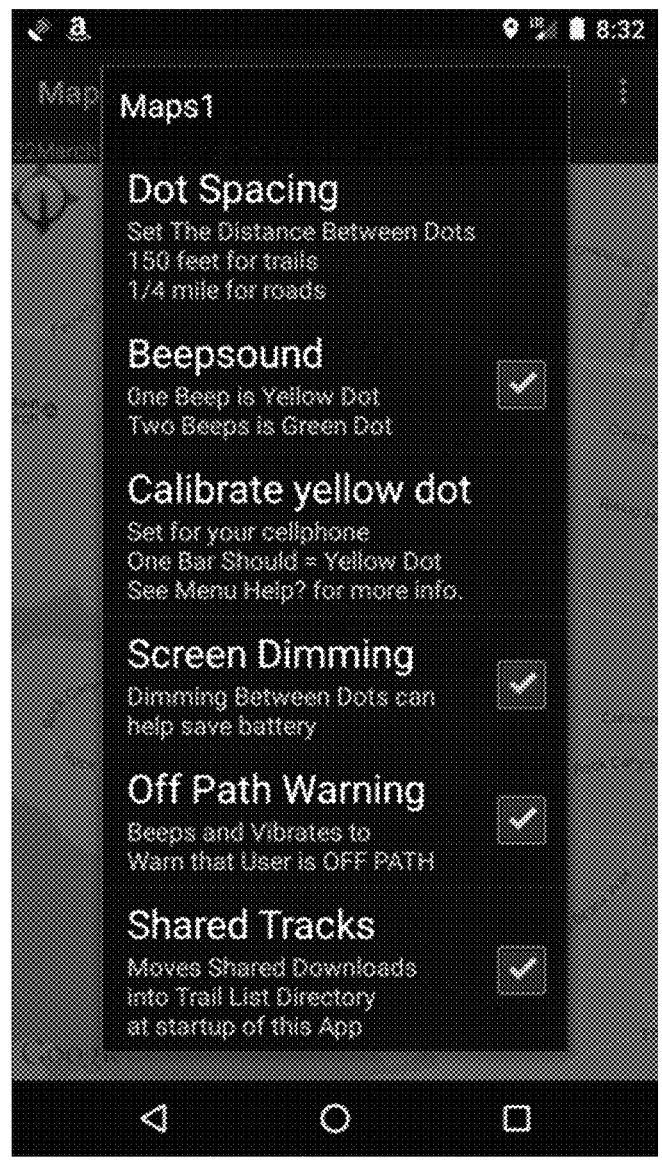
FIG. 14 is a view of a software application for measuring, recording, and displaying signal strength data as a function of location in one embodiment of the present invention showing the Settings submenu accessed from menu 1301.
Figure 15:
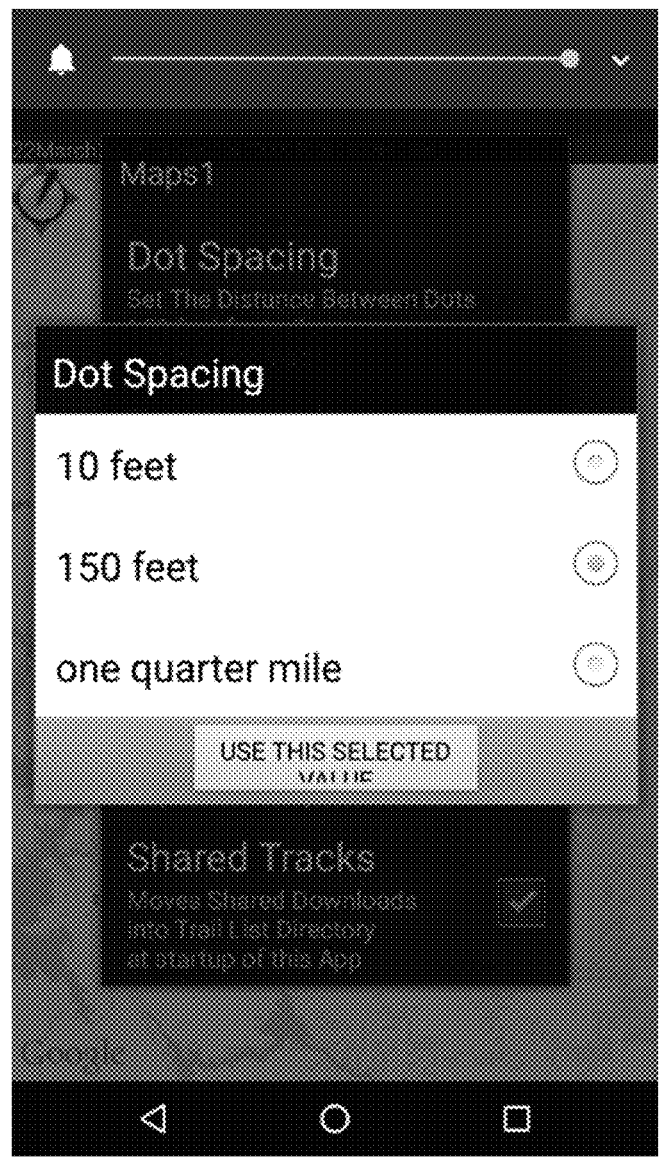
FIG. 15 is a view of a software application for measuring, recording, and displaying signal strength data as a function of location in one embodiment of the present invention showing the "Dot Spacing" user choices for the distance between recorded data points.

FIG. 12 is a view of a software application running on a Nexus 5X cellular phone for measuring, recording, and displaying signal strength data as a function of location. The GPS-determined present position is shown as 1201. When the user taps to select 1202, shown as three vertical dots, a menu 1301 appears as shown in FIG. 13. When the user selects "Settings" from the menu 1301, a list of settings appears as shown in FIG. 14. Selecting the "Dot Spacing" menu option opens the menu shown in FIG. 15. In this embodiment, the user can select 10 feet, 150 feet, or one quarter mile spacing between recording data points. In other embodiments, other dot spacing interval spacing values such as 100 feet can be offered as options, or users can enter any value through either a text entry dialog box or a distance selection slider bar. When the user selects a value or selects 'Use This Selected Value', the "Settings" menu will return as seen in FIG. 14.

In different devices, the relationship between numerical signal strength and the ability to use a signal to, for example, place a phone call, is different. Different mobile devices have different sensitivities. The software application includes the option to manually or automatically adjust the relationship between measured numerical signal strength and the graphical display of signal strength on the map shown in FIG. 12 using a calibration process. The calibration process adjusts the graphical indicators of signal strength for the device running the software application such that the graphics indicating a useable signal, a marginal signal, and an unusable signal correspond with the appropriate numerical signal strengths for those conditions on this particular device. For example, some devices can place a phone call at measured signal strength of at least −112 dB while other devices require signal strength of at least −103 dB to place a call. This invention includes a method to calibrate the sensitivity of a device to account for differences between devices. The calibration process adjusts the graphical display of signal strength on each device such that the location-dependent signal strength graphics displayed on that device correctly distinguish between points with usable and unusable signals. This calibration process can be manual, based on the user selecting the minimum usable signal strength from a menu, or automatic, where the user's device model is detected by the software application and the known appropriate calibration is applied without user intervention.

Figure 16:
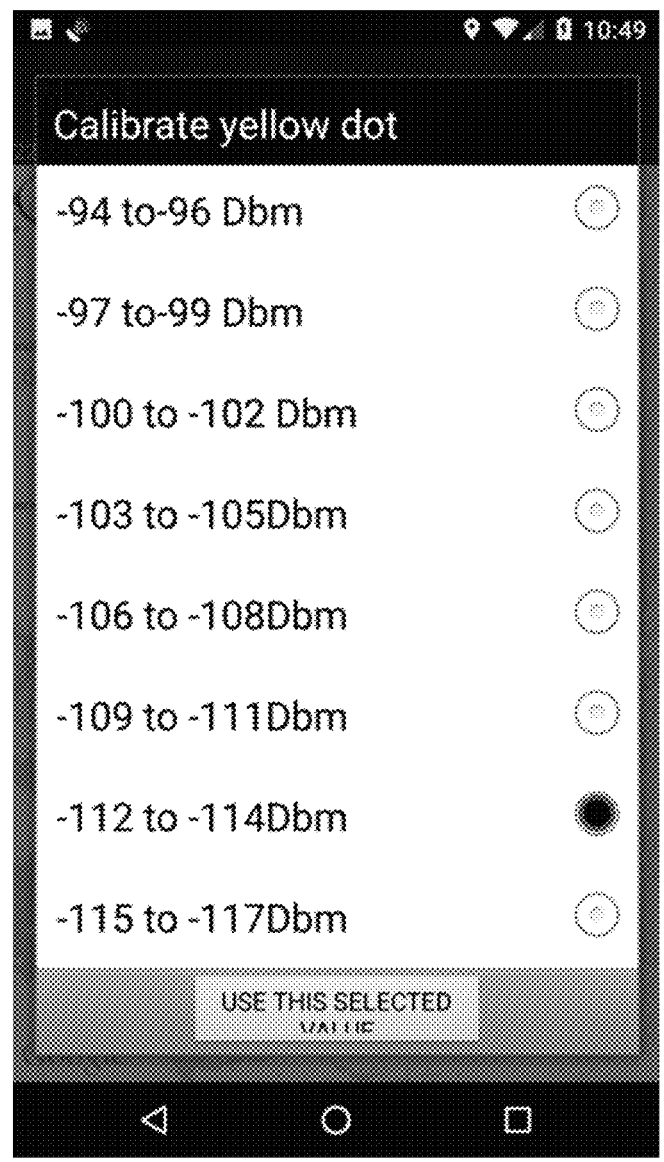
FIG. 16 is a view of a software application for measuring, recording, and displaying signal strength data as a function of location in one embodiment of the present invention showing the Calibrate Yellow Dot choices to manually adjust for model differences in mobile device sensitivity.

In one embodiment, a user can select the "Calibrate yellow dot" option as shown in the Settings menu in FIG. 14. This displays a "Calibrate yellow dot" menu as shown in FIG. 16, where the selected calibration level is −112 to −114 dBm. This manually entered value was selected by placing the mobile device at a location where it was barely able to complete a call and then noting its signal strength value. This value was verified by moving the phone to a location where it had 2 dBm weaker signal and determining that a call could not be completed. In a preferred embodiment, the application uses a yellow dot as an icon to represent a location with the minimum signal strength at which a phone call can be placed. In FIG. 16, the mobile device is a Nexus 5X cellular phone and its current signal strength value can be found by navigating the phone's Settings/About phone/Status/SIM Status/Signal Strength menu. When the user uploads a path-based data set to a repository database or otherwise shares that data set between devices, the mobile device model is recorded and included in the data set and the correct calibration value can be applied based on the sensitivity behavior known for that phone model. This calibration method allows a yellow dot displayed on any mobile device to indicate a location with the minimum signal required to place a phone call on that mobile device, even when the data set was collected by a mobile device with a different sensitivity level.

The application is able to play audio cues to indicate changes in measured parameters such as cellular signal levels, or to indicate that the user is currently more than a specified distance from the nearest data point in a path-based data set. In one embodiment, the user can enable audio cues representing changes in cellular signal level by enabling "Beepsound" in the "Settings" menu in FIG. 14. In this embodiment, a single beep is played when a marginal signal, one that would be indicated by a yellow dot on the application's map display, is measured and recorded. Two beeps are played when a strong signal is measured and recorded. These cues communicate the general signal condition along a path to the user without requiring the user to monitor the mobile device's display, allowing the user to look at the trail, rather than be distracted by constantly looking at the display, thus improving safety.

While viewing the "Settings" menu in FIG. 14, the user can select "Screen Dimming." In this embodiment, when this option is enabled the screen display will be dimmed between recording of signal strength dots to reduce battery consumption. The screen brightens for a few seconds each time the user has moved to a location where a new signal strength data point is recorded. Mobile device displays consume a significant amount of battery charge, and allowing the screen to dim between recording each data point can save a meaningful amount of battery charge.

The application can display path-dependent data collected from the user's mobile device or shared from other devices. In one embodiment, the user can select the "Shared Tracks" option in the "Settings" menu from FIG. 14 in order to enable the use of path-based data collected from other devices. In this embodiment, when this option is selected, the next time the application is started it moves any path-based data files on the phone into the "Trail List" directory where the application stores and reads path-based data. This "Shared Tracks" option imports data files whether they were downloaded onto the phone via email, a repository database, or transferred to the phone by any other method. These shared path files can then be seen and selected in the "Trail List" when the user selects "Trail List" from the menu choices in FIG. 13.

Figure 17:
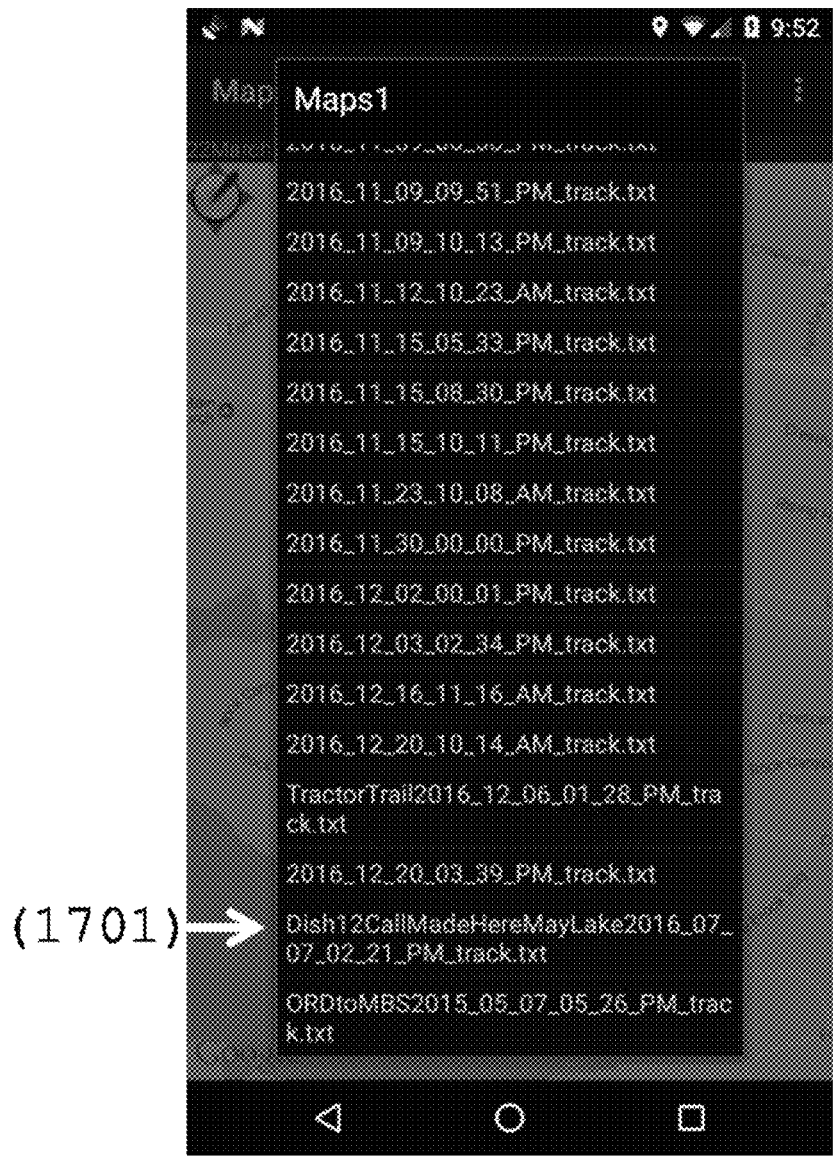
FIG. 17 is a view of a software application for measuring, recording, and displaying signal strength data as a function of location in one embodiment of the present invention showing the naming method of each recorded path-dependent data file and examples of edited names.

In one embodiment, when a user records signal strength data along a path and exits the application, the recorded path data is then automatically moved to the "Trail List" directory in the mobile device. In a preferred embodiment, the path-based data file is generated automatically, consisting of the year, month, day, and time of day that the data collection began. FIG. 17 shows actual files of signal path data that are contained in the "Trail List" Directory. Descriptive filenames have been added to some of the files to enable the user to more easily locate a file to select and display on the mobile device. These filenames may be added to the "Trail List" files through a filename editor built into the application or through an external application.

A file may be selected from the list shown in FIG. 17 by selecting it with a finger or stylus on a touch screen or any alternative pointing and selection method available through the mobile device. This selection will allow the selected data in that path file to show on the screen map display, thus allowing the user to follow the path of any or all of the visible "dots" representing path-based data.

Additionally, the user can perform a "long touch" by touching a filename for several seconds, which opens a text editing mode that allows the changes to the filename.

In a preferred embodiment, the user may perform a long touch anywhere on the screen to bring up the menu shown in FIG. 18. To start recording, the user can select "START DOT TRACKS." A colored icon representing the signal strength at that location will then appear at the mobile device's current position. As the mobile device moves, the application detects the change in position through the phone's GPS coordinates, and each time the device has moved a distance equal to the value specified in the "Dot Spacing" menu in FIG. 15, a data point representing a measured parameter such as cellular signal strength is recorded and displayed as an icon on the map. This process continues until the application has been closed.

Figure 18A:
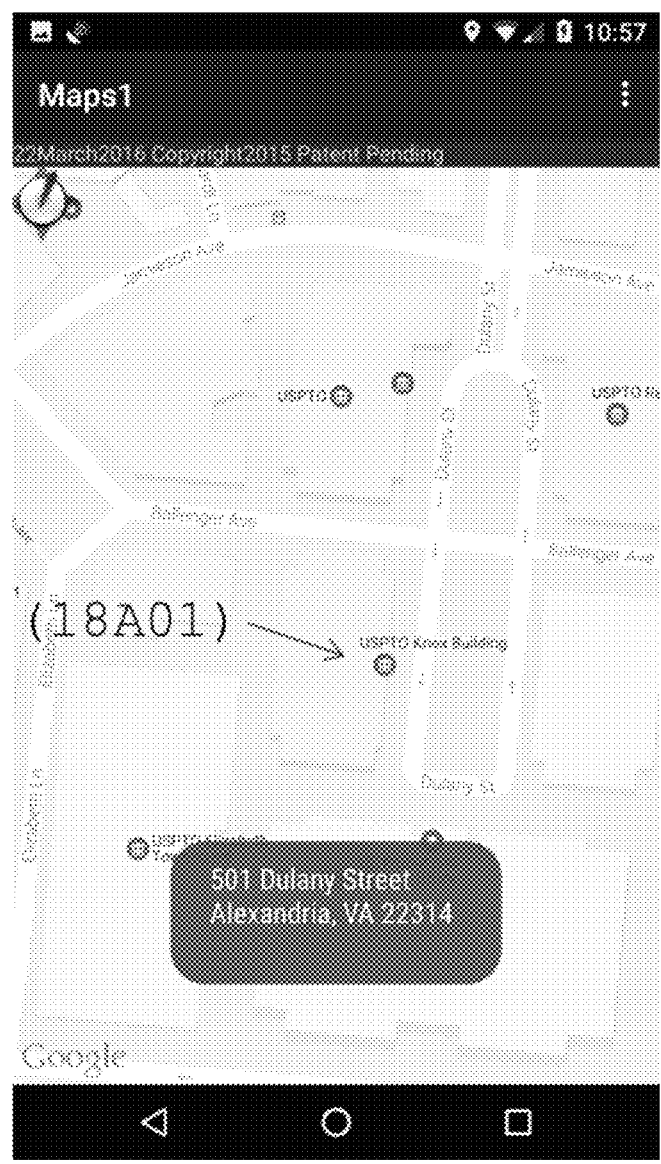
FIG. 18A is a view of a software application for measuring, recording, and displaying signal strength data as a function of location in one embodiment of the present invention showing the address message that appears when "GET ADDRESS" is selected in the "Long Touch Menu" shown in FIG. 18.

Another option available from the menu shown in FIG. 18 is labeled "GET ADDRESS." If the user performed a long touch at location 18A01 in FIG. 18A on the mobile device, the menu displayed in FIG. 18 will appear. When the user then selects GET ADDRESS, the address shown in FIG. 18A, "501 Dulany Street, Alexandria, Va. 22314," appears.

Another option available from the menu shown in FIG. 18 is labeled "PLACE ONE DOT." When this option is selected, the application will measure the cellular signal strength at the mobile device's current location, record it, and represent the location and value of the measurement as an icon on the map. This single, manually recorded data point can be distinguished by the icon's size and shape from the series of dots representing signal strengths along a path that are collected and displayed when a user selects "START DOT TRACKS." This distinction allows manually placed data points to be easily located, which can be useful to call attention to a specific location or event, for example indicating that an actual cellular phone call was made from the manually recorded location, or that a cellular phone call was possible from this location with the use of a signal enhancer. The significance and meaning of a specific manually recorded data point can be further conveyed by altering the name of the file in the "Trail List" as shown in 1701 of FIG. 17.

Figure 19:
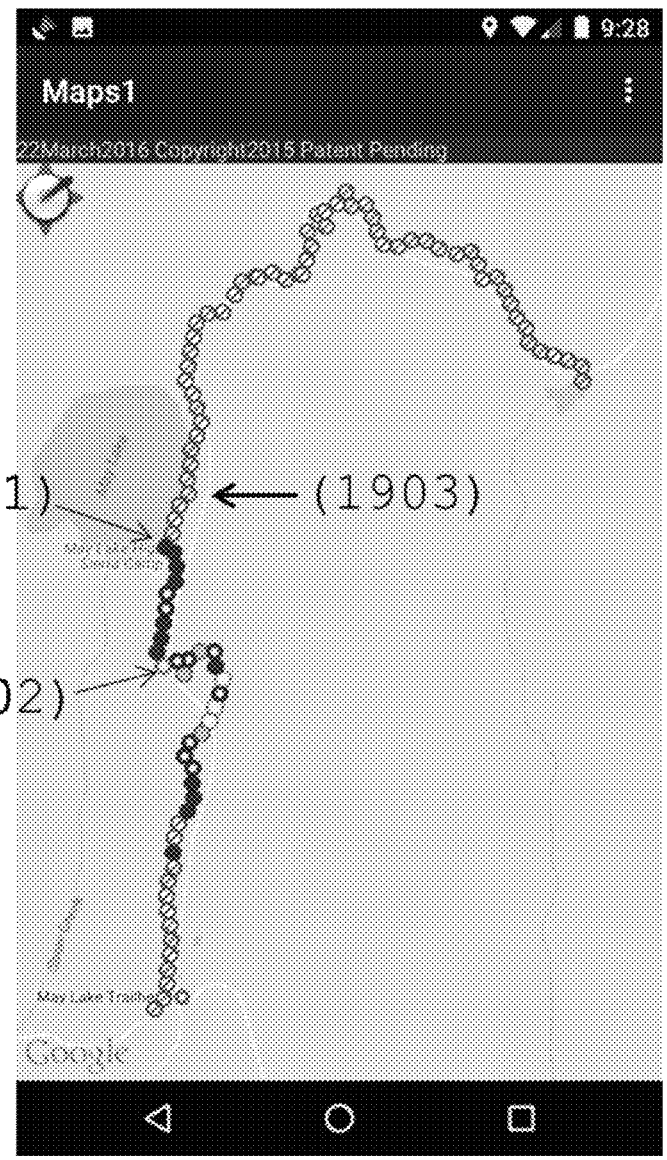
FIG. 19 is a view of a software application for measuring, recording, and displaying signal strength data as a function of location in one embodiment of the present invention showing example data collected in Yosemite National Park. Location 1901 shows a location with a weak signal and 1902 shows a location with a stronger signal. Location 1903 shows a location with no detectable signal, meaning no connection to any base station cell tower at all.

Users may employ accessories such as mobile signal enhancers to increase the signal strength of the mobile signal accessed by their mobile devices. When signal strength and corresponding location data are uploaded to a repository database or repository databases, the presence and identity of said accessories is simultaneously uploaded and associated with said data. Users may filter, by selecting 712 of FIG. 7 the displayed or downloaded signal strength and corresponding location data based on the presence and type of accessories used to collect said data. FIG. 19 shows signal strength path data, recorded on Jul. 7, 2016 on a hiking trail in Yosemite National Park near May Lake. The red signal strength dot at 1901 near May Lake represents a location where a phone call cannot normally be made. The green dot at 1902, representing a stronger signal, is the closest location where a phone call can be expected to be made. However, when a 12" diameter wireless parabolic signal enhancer, as described in patent application Ser. No. 14/204,296, was used to improve signal strength near 1901, signal strength was sufficient to place a phone call from this location. In order to record this fact, a single data point was manually recorded using the "PLACE ONE DOT" feature shown in FIG. 18. This data point was recorded and displayed as a yellow dot as shown at location 2001 in FIG. 20. This yellow dot, representing marginal signal strength, indicated that the signal enhancer enabled a phone call to be made at this same location that was previously recorded as a red dot that represented a weak signal, in location 1901 in FIG. 19. The filename for this data point was edited as shown at 1701 in FIG. 17 in order to call attention to the ability of a signal enhancer to enable a phone call from this location. This file's descriptive filename and the data point it contains represent potentially life-saving information.

Figure 21:
FIG. 21 is a view of a software application for measuring, recording, and displaying signal strength data as a function of location in one embodiment of the present invention showing the path of an airplane flight from ORD Chicago, Ill. to MBS in Saginaw, Mich., demonstrating the application functioning on a mobile device even when the mobile device is in airplane mode and not connected to a wireless network.
Figure 22:
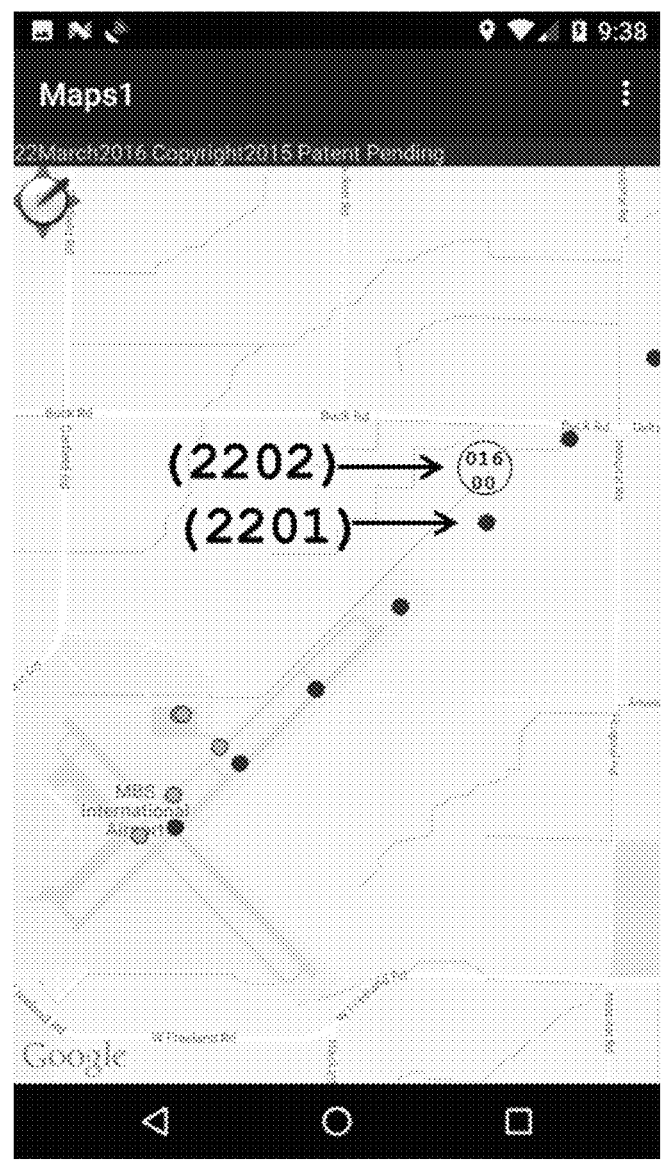
FIG. 22 is a detailed view of a subset of the data shown in FIG. 21, showing the path the airplane followed while landing at MBS airport.

Parameters other than signal strength can be recorded and displayed by the application. For example, while on an airplane flight, with the mobile device in airplane mode, the GPS system can still be activated, thereby enabling location and other parameter data to still be recorded without connecting to a wireless network. This allows path location data, including altitude and other data to be recorded while flying in an airplane or any other type of flying machine while still complying with FAA rules requiring passengers to not connect to a wireless network. FIG. 21 is display of location data taken of a flight from ORD airport in Chicago, Ill. to MBS airport in Saginaw, Mich. FIG. 22 shows a closer view of the same data from FIG. 21, focusing on the data collected during landing at MBS and taxiing to the gate. Aviation incidents occur in which communication and navigational systems fail and where the information displayed in FIGS. 21 and 22 would be a useful backup navigation aid. In this example, selecting icon 2201 in FIG. 22 in the application or in the repository database interface causes icon 2202 to appear, which in this view displays the GPS-determined altitude in hundreds of feet above mean sea level. This method of displaying data in a series of alpha numeric characters rather than through icon color, shape, or size, may be preferable for some applications. In this example, the icon displays "016" indicating that the altitude is 1600 feet. Each data point in FIGS. 21 and 22 can be selected to display an icon similar to 2202, indicating altitude as a function of location along the airplane's path. In addition to altitude, any other location-dependent parameter, that a mobile device is capable of measuring, can be displayed in similar fashion.

Figure 23:
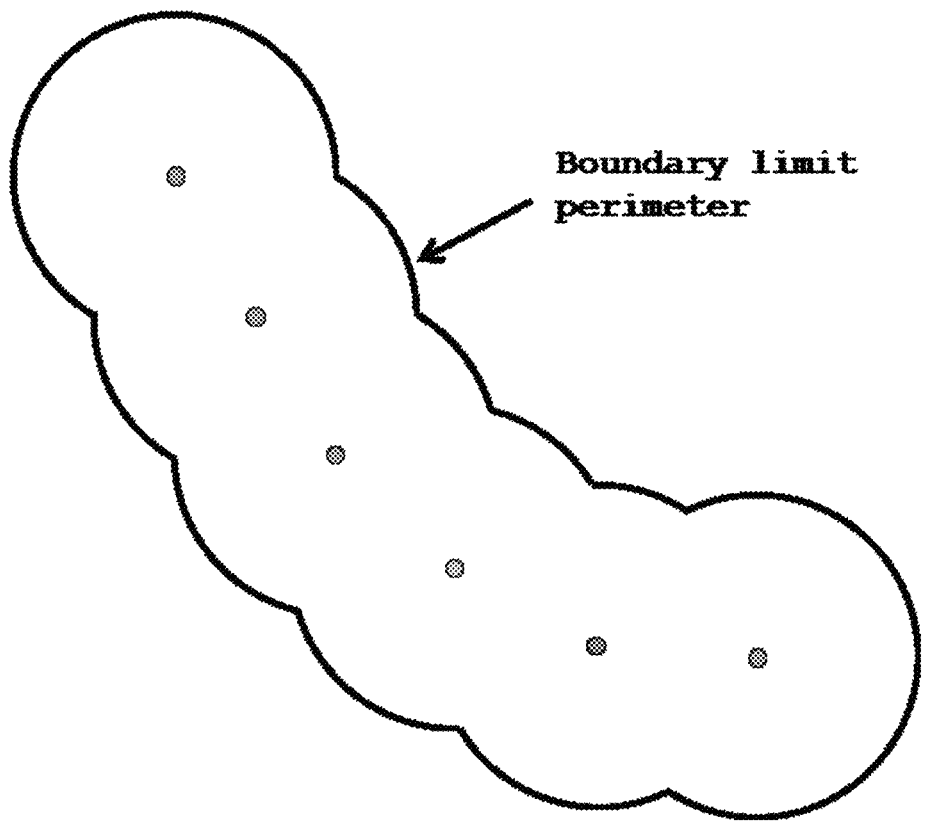
FIG. 23 is a view of a software application for measuring, recording, and displaying signal strength data as a function of location in one embodiment of the present invention showing the "Off Path Warning" concept and perimeter limit of warning suppression beyond which the user's location will be defined as "off path" and trigger a warning.

Regularly, travelers attempting to follow a path unwittingly stray from it, for instance while hiking on an isolated trail. This often results in death. In one embodiment of this invention, users can select "Off Path Warning" from the "Settings" menu shown in FIG. 14. When this mode is activated, the application plays an audio and vibration warning whenever the mobile device's location is more than a specified distance from a data point in the selected path data. For instance, in a preferred embodiment, if the "Dot Spacing" option is set to 150 feet, an audio and vibration warning is triggered when the user is 150 feet from the location of the nearest data point as shown in FIG. 23. This prompts the user to look at the map display and find the path back from the present location to the desired path. The application can easily test, every few seconds, for an off-path condition by sequentially testing the distance to each data point on the selected path from the current GPS-provided location. As long as one of the tested distances is at or below 150 feet, the selected off-path threshold amount, the warning is suppressed. Otherwise the user is notified and prompted to adjust accordingly. In other embodiments, the threshold may be larger or smaller than 150 feet.

In one embodiment, before a user enters an area with poor signal strength, the signal strength and corresponding location coordinates for that area, previously collected by one or more devices or users and stored in the repository databases, may be transmitted from said repository databases to the user's mobile device and stored in its internal memory. Said signal strength and corresponding location coordinates can provide the user of said device with a map of signal strength as a function of location even in an area with no cellular coverage and thus no ability to access the data from the repository databases in real time.

In one embodiment, the software application in FIG. 12, or a map displaying information from the repository database over the internet in FIG. 6, displays only measured data at points on a map where it was measured. In another embodiment, the data between measurements may be interpolated to create predicted signal strength along a continuous path or across 2-dimensional areas across the map. In all examples described in this specification, the data is recorded and displayed as navigable paths, rather than a collection of arbitrarily-ordered data points.

In one embodiment, data retrieved from a repository database may be displayed as a layer in a map application such as Apple Maps, Google Maps or Bing Maps, allowing users of those mapping and navigation applications to see signal strength paths, airplane or boat paths, acceleration road bumpiness paths, and any other navigable path data that mobile devices can record.

Although the present disclosure refers expressly to the "GPS" or "Global Positioning System", it should be understood that this term and its abbreviation "GPS" are being used expansively to include any satellite-based navigation-signal broadcast system, and would therefore include other systems used around the world including the BeiDou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

It will be apparent to a skilled artisan that the embodiments described above are exemplary of inventions that may have greater scope than any of the singular descriptions. There may be many alterations made in these examples without departing from the spirit and scope of the invention. For example, the embodiments described above describe cellular signal strength as the primary layer, but any parameter measureable by the mobile device could be measured, recorded, and displayed using this method. For example, a device could measure, record, and display temperature, chemical concentration, radioactivity, or landmine locations using this method. These and many other features may change in different embodiments.

The invention claimed is:

1. A computer-implemented method for selecting a desired path from a data set collected from data points along one or more paths or portions of the paths, comprising:
   a. Selecting one or more sets of icon designs representing one or more location-specific parameter values; wherein each icon design represents a measured location-specific parameter value of a data point as a function of location along one or more navigable paths;
   b. Displaying all the data points as icons on a map using the selected one or more sets of icon designs;
   c. Defining a starting point by selecting a specific icon on the map for a path segment;
   d. Defining an ending point by selecting another specific icon that is part of the path segment as the starting point;
   e. Repeating elements c. and d. until all desired path segments have been selected;
   f. Connecting all the desired path segments as the desired path;
   g. Displaying the desired path with the icons along the desired path on the map; wherein other icons not on the desired path are not displayed.

2. The method of claim 1, wherein the location-specified parameter value is wireless signal strength.

3. The method of claim 1, further comprising:
   Calibrating the location-specific parameter values to compensate for differences in mobile device signal strength sensitivity, comprising:
   i. Determining the lowest signal strength at which a mobile device can communicate using a wireless network;
   ii. Entering said lowest signal strength into a software application on the mobile device;
   iii. Adjusting the display of the one or more sets of icons designs used to indicate the usability of a wireless signal along the navigable path by comparing each measured parameter value in the data set with said lowest signal and displaying an icon using the corresponding icon design at said location representing the usability of the signal strength at said location on the mobile device running the software application.

4. The method of claim 1, wherein the location-specific parameter value is GPS-determined altitude represented by icon design; wherein the icon design includes alpha numeric characters.

5. The method of claim 1, wherein the location-specific parameter value is wireless signal strength and utilize at least one of a first icon design to indicate low but detectable signal strength or a second icon design to indicate no connection at all to the wireless base station.

6. The method of claim 1, further comprising:
   Measuring a current location of the mobile device with a GPS;
   Calculating the distance between the measured location and each icons in the desired path displayed;
   Notifying the user, using the mobile device, when the measured location is not within a specified distance from the nearest icon in the desired path; wherein the notifying is performed by playing an audio warning, activating a vibration, or both.

7. The method of claim 6, further comprising:
   Dimming the screen of the mobile device when the measured current location is between any two icons on the desired path.

8. The method of claim 6, further comprising:
   Switching the mobile device to energy saving mode to reduce battery consumption.

9. The method of claim 1, further comprising:
   Downloading the desired path selected to a mobile device.

10. The method of claim 1, further comprising:
    Printing the map of the desired path with the icons along the desired path on the map.

* * * * *